July 10, 1956

C. L. SCHRALL 2,754,070

FISHING REEL

Filed Feb. 24, 1954

INVENTOR.
Charles L. Schrall
BY
William C. Babcock
ATTORNEY

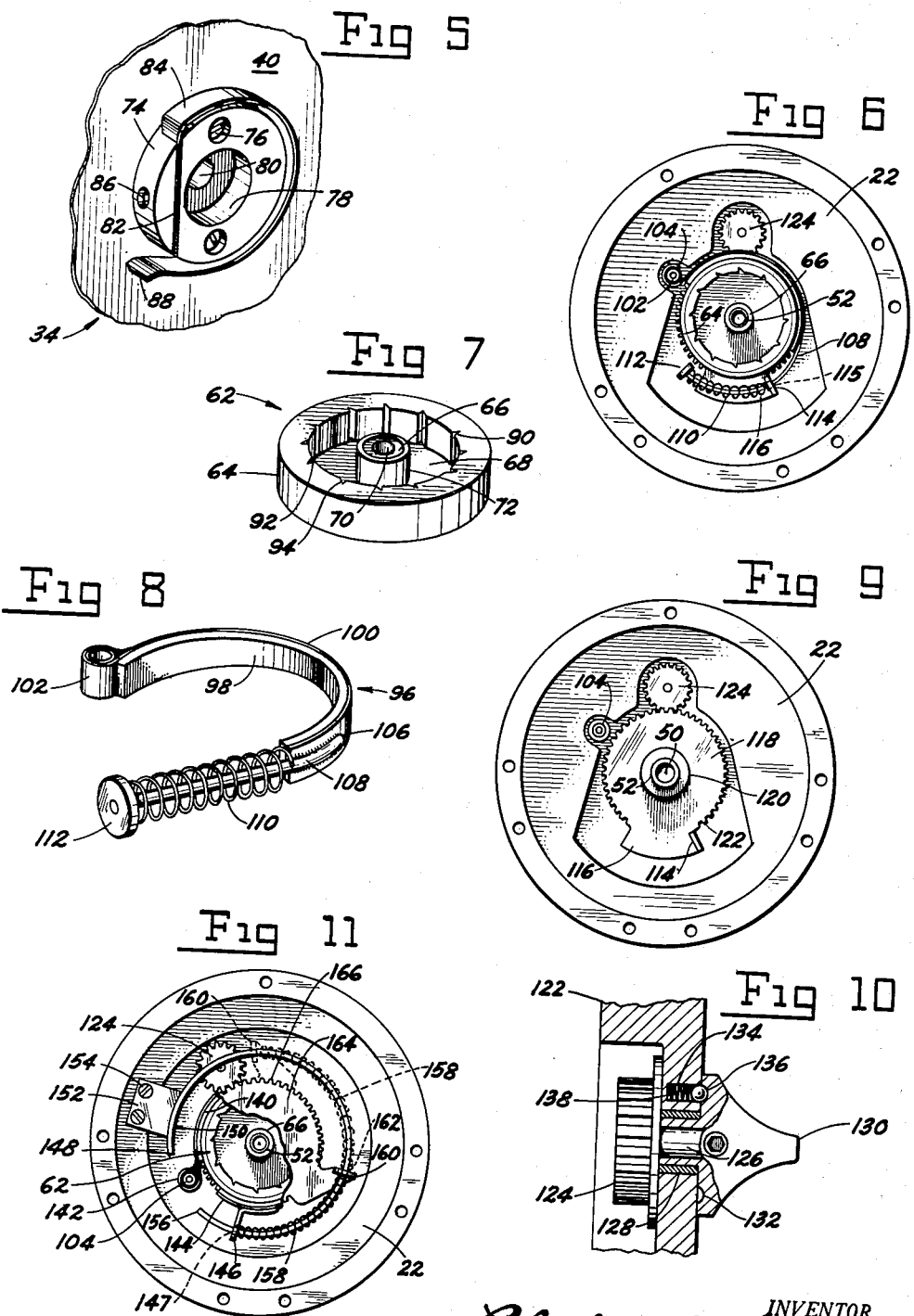

United States Patent Office 2,754,070
Patented July 10, 1956

2,754,070

FISHING REEL

Charles L. Schrall, Wayzata, Minn.

Application February 24, 1954, Serial No. 412,301

16 Claims. (Cl. 242—84.5)

The present application relates to fishing reels and more particularly to a fishing reel which incorporates improved braking mechanism.

Many types of fishing reels are known in which a crank is provided for rotation of the reel spool in one direction to reel in a fishing line, presumably with a fish on the end thereof. It is also customary in such reels to provide some sort of brake mechanism which may be used to retard the unwinding of the spool when a fish attempts to pull out the line. Some such brakes provide for adjustment of the brake tension so that the degree of retarding action with which the fish is confronted may be varied.

While a number of these brakes are satisfactory for inland fishing with relatively small fish, they are not suitable for larger fish or those which exhibit a strong tendency to fight the reeling operation. Particularly in deep sea fishing there is a need for an improved braking mechanism in which a relatively wide range of adjustment is available to vary the tension on the line during the withdrawal of relatively long lengths of the line as the fish sound or try to escape.

When existing reel and brake mechanisms are utilized for the larger game fish, it often happens that a single dive or run by one of these fish will substantially wear out the braking mechanism of a given reel, so that it is necessary to disassemble the reel and replace or repair the brake mechanism before the equipment can be used again.

With these problems of the prior art in view it is accordingly one object of the present invention to provide an improved fishing reel and brake mechanism suitable for a wide range of use.

Another object is a fishing reel brake mechanism in which the tensioning or braking effect on the reel spool is capable of adjustment through a very wide range.

A further object is a fishing reel brake mechanism in which the tendency of the brake to lock the spool or provide uneven tension is eliminated.

Still another object is a fishing reel brake in which a brake band of relatively large area may be used.

Another object is a fishing reel brake mechanism in which both the brake band and its tensioning spring extends circumferentially around a brake drum which is co-axial with the spool.

Still another object is a reel brake in which a tensioning spring is supported in circumferential guide means around a brake drum with provision for adjustment of one end of the spring throughout a major portion of the circumference of the drum to provide a wide range of tension adjustment.

Other objects and advantages will be apparent from the following specification in which certain preferred embodiments of the invention are described with particular reference to the accompanying drawings. In these drawings, wherein like reference characters indicate like parts, Figure 1 is a perspective view of a fishing reel embodying features of the present invention;

Fig. 5 is a partial perspective view of the opposite end of the spool of Fig. 4;

Fig. 6 is a perspective view of the remaining side plate of the mechanism designed for assembly with the parts of Figs. 3 and 4;

Fig. 7 is a similar view of the brake drum and part of the one-way clutch mechanism of the reel;

Fig. 8 is a similar view of the brake band and tensioning spring of the mechanism of Fig. 6;

Fig. 9 is a view similar to Fig. 6 with the brake drum, brake band and spring removed;

Fig. 10 is a sectional view on the line 10—10 of Fig. 2 showing details of the brake tension adjustment knob; and Fig. 11 is a perspective view similar to Fig. 6 of an alternate and preferred embodiment of the brake mechanism.

Figure 1:
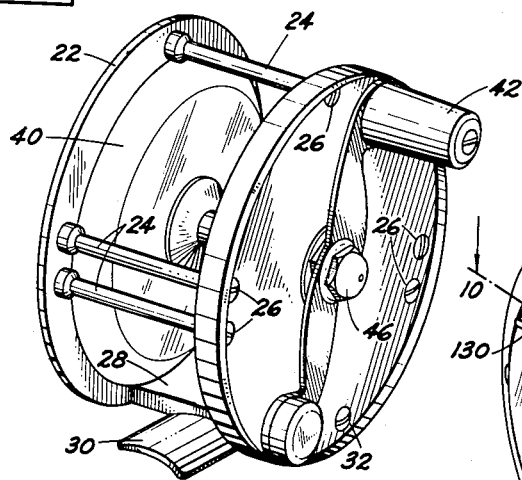
Figure 2:
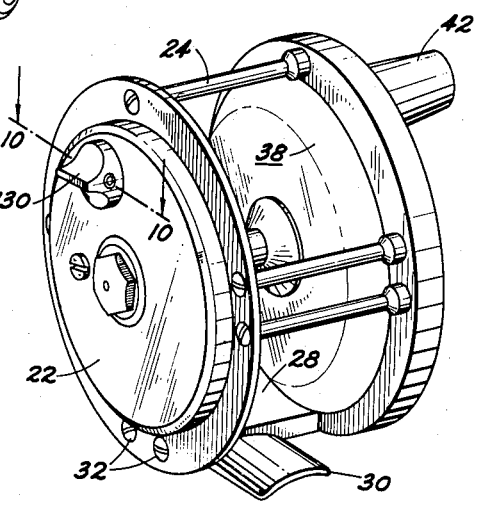
Fig. 2 is a perspective view of the opposite side of the reel of Fig. 1.
Figure 3:
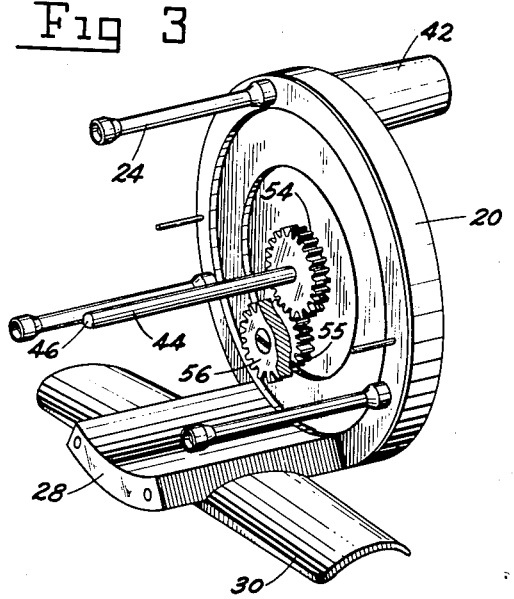
Fig. 3 is a view of one of the side plates of the reel of Fig. 1 with the spool and remaining side plate removed.

In connection with the embodiment of the invention shown in Figures 1 through 10 inclusive, the fishing reel mechanism includes a pair of opposite casing members or side plates 20 and 22 respectively. These side plates are designed to be substantially stationary and are separated from each other the desired distance to accommodate a rotatable reel. The desired spacing is obtained by the provision of spacer boards 24 which are held in assembled relation with respect to the casing side plates by bolts 26. In the base of the reel an enlarged cross bar or support 28 is provided. This support includes a longitudinally extending transversely curved member 30 adapted to fit the handle of a fishing reel and be secured in place in known manner. The base or enlarged cross bar 28 is secured between the side plates by bolts 32 in the same manner as the spacer bars are held in position.

Figure 4:
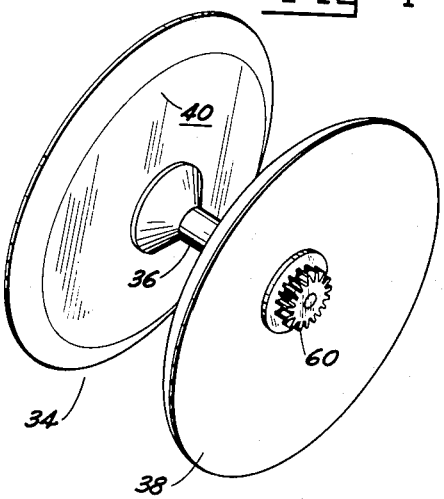
Fig. 4 is a perspective view of one of the rotatable spools used in the device of Fig. 1.

Between the side plates 20 and 22 a suitable spool member 34 is mounted. This spool, as shown in Fig. 4, has a central hub portion 36 and side flanges 38 and 40 secured to the hub.

In order to provide for rotation of the spool to wind the line on or off the spool, a hand crank 42 is associated with one of the casing members 20. The crank 42 is carried on the outer side of the casing and is secured to a shaft 44. The crank is tapped to fit a thread on shaft 44 and is locked on by jam nut 46. The shaft 44 is rotatably mounted in the side plate 20 and extends across parallel to the spacer bars 24 to the other side plate 22. The opposite end 46 of shaft 44 is adapted to fit the inside 50 of a hollow bearing support 52 (Fig. 9) located on the inside of the opposite side plate 22. Thus the shaft is rotatably supported at its opposite ends in the respective casing members or side plates.

The spool 34 is rotatably supported on the shaft 44, but is designed to rotate in either direction at a higher speed than the speed of rotation of the shaft. For this purpose shaft 44 is provided with a driving gear 54 immediately adjacent the inside of the casing member or side plate 20.

Driving gear 54 engages a smaller intermediate gear 55 which is rotatably supported on a stud or idler shaft 58 on side plate 20. The small gear 55 is associated with a larger intermediate gear 56 for direct rotation at the same angular speed. Gear 56 in turn engages and drives the driving gear 60 on one flange 38 of spool 34. Gear 60 is secured to the spool for rotation therewith and is co-axial with the desired axis of rotation of the spool. In this connection the gear 60 is provided with a central bearing opening adapted to fit the shaft 44 so that the engagement of the gear on the shaft provides a bearing both for the gear and for the corresponding end of the spool. Because of the gear ratios involved, the spool 34 will be rotated in the same direction as the shaft 44, but at a substantially higher angular speed.

In order to provide the desired rotating or tensioning effect during unwinding of a line from the spool, a suitable brake or tension mechanism is associated with the other spool flange 40 and casing member or side plate 22, as shown particularly in Figs. 6 through 10. A suitable brake member indicated generally at 62 in Fig. 7 is operatively connected to and associated with the spool flange 40 for positive rotation of the brake drum 62 by the spool in at least one direction. The brake member 62 has an outer cylindrical braking surface or drum 64 designed to cooperate with the brake band described below. At the center of the member 62 is inner bearing portion 66 which has its cylindrical inner surface 70 dimensioned and adapted to fit over the hollow bearing post 52 of casing member 22. Thus the post 52 supports the brake member 62 for rotation in either direction subject to the retarding effect of the brake band.

Between the inner bearing portion 66 of the brake member 62 and the outer drum portion or braking surface 64, the member is cut away or recessed as indicated at 68 to provide space for the one-way clutch mechanism carried directly on the spool flange 40. To assist in supporting the clutch member and corresponding flange of the spool, the inner bearing member 66 is provided with an external cylindrical bearing surface 72 as shown in Fig. 7.

The one-way clutch mechanism includes an annular clutch member 74 secured by bolts 76 to the outer surface of the spool flange 40 for rotation with the flange. The inner cylindrical surface 78 of this annular member 74 is designed to receive the corresponding external bearing surface 72 of the inner bearing member 66 of brake drum and clutch member 62. Thus the spool flange is effectively supported by the brake member. The spool flange 40, or if perferred, the annular member 74, also carries a suitable bearing provided with an opening 80 adapted to fit the shaft 44 and thus additionally supports flange 40 and the corresponding end of the spool.

The annular member 74 is provided with a slot corresponding to a chord of the circular outer face of the member. This slot receives one end of a spring driving pawl 84. The spring pawl 84 is clamped in the slot 82 by a suitable fastening or securing screw 86. The outer end 88 of the pawl 84 is designed for engagement with the internal ratchet teeth 90 on the inside of the brake band portion 64. The notches which provide the ratchet teeth have a substantially radial surface 92 at one edge designed for engagement with the end of spring 88 to drive the member 62 in a counter-clockwise direction as illustrated in Figs. 6, 7 and 9 (corresponding to a clockwise direction of rotation in Fig. 5). The opposite edges 94 of the notches providing the ratchet teeth are sloped gently into the remaining inner cylindrical clutch surface of the annular drum portion 64 so that the spring pawl end 88 may slide freely over the surface 94 and thus permit relative slippage when the spool and pawl are rotated relatively in the opposite direction.

To provide the desired braking or tensioning effect on the member 62 a suitable brake band, indicated generally at 96 in Fig. 8, is provided. This brake member includes an inner band portion 98 which may be of desired frictional material, together with an outer metallic supporting band 100. The first end of this outer band carries a suitable support means such as the cylindrical bearing 102. This supporting bearing 102 is designed for engagement with a stud 104 on the inside of casing member 22 to position the corresponding end of the brake band immediately adjacent the periphery of the braking surface 64 when the parts are assembled as in Fig. 6. The other or second end 106 of the brake band assembly is provided with connecting means for a suitable tensioning spring. In this case the connecting means includes an extension in the form of a rod 108 which extends generally circumferentially around the brake drum and is spaced from the drum a short distance to avoid undesired engagement with the drum itself. The rod 108 serves both as a connecting means and as a supporting and guide means for the tensioning spring 110. An end plate 112 at the outer end of extension 108 serves as a stop or limit for one end of spring 110. As the spring pushes against this stop with greater or lesser tension depending upon the position of the adjusting mechanism described below, the tension on brake band 98 will be correspondingly increased or decreased to provide the desired retarding or braking effect on the surface 64.

To adjust the tension of spring 110, the following adjustment mechanism is provided. The opposite end of the spring is engaged by a spring follower or stop 114 designed for circumferential movement around the drum surface 64 co-axially with the supporting shaft 44 of the reel. The spring follower portion 114 is slotted or apertured at 115 to accommodate the rod-like extension 108. This follower plate 114 extends at right angles from a sector 116 of the adjusting plate 118. This adjusting plate has a central bearing portion which is rotatably supported on the outer surface of the bearing post 52 on side plate 22.

The adjusting plate 118, throughout the major portion of its circumference, carries gear teeth 112 designed for engagement with a suitable adjusting gear 124. The adjusting gear is carried by a shaft 126 (Fig. 10) and this shaft is rotatably mounted in a suitable bearing 128 in the side plate 22. A knob 130 on the outer end of shaft 124 permits rotary adjustment of the shaft and adjusting gear and thus causes corresponding rotary adjustment of the plate 118 and its spring follower 114. In this manner, the tension of the spring may be adjusted by changing the position of the spring follower 114 throughout a substantial portion of the circumference of the brake drum.

To retain the adjusting mechanism in its adjusted position, the knob 130 is provided with a series of recesses 132 on its inner face adjacent the side plate 22. The side plate also has a suitable recess 134 in which a ball 136 is mounted and is urged outwardly by a spring 138 to engage one of the notches 132 at a time. The engagement of the spring-pressed ball 136, coupled with the gear ratio, i. e., the fact that gear 124 is relatively small compared to the toothed adjustment plate 118, insures retention of the adjusting mechanism in the desired position.

The operation of the embodiment described above is believed to be apparent from the above comments. The crank 42 permits manual rotation of the reel or spool in either direction corresponding to the direction of rotation of the crank but at a higher speed. The motion of the spool in one of these directions may be retarded or braked by suitable adjustment of the spring adjustment knob 130 which increases or decreases the initial tension on spring 110. Normally, the line is wound on the spool 34 in such a manner that the pawl 88 of Fig. 5 will engage the central teeth 90 of the drum 64 and rotate the drum with the spool as the line is being unwound. This will correspond to a counterclockwise direction of rotation in Fig. 6.

Thus it will be apparent that the brake band assembly is so oriented that it extends from its fixed support 104 in a direction opposite to the direction of rotation of the brake drum when the latter is being positively driven by the spool. This particular relative direction of rotation, in combination with the particular spring arrangement, provides an extremely smooth and uniform braking effect during operation. In ordinary prior reels, if dirt, moisture or any other element enters between the brake band and brake drum, it might cause the braking effect to vary. This in turn would cause the line being pulled off the spool to vary in the tension of pull. In the present case, however, the spring 110 would compress slightly and thus relieve the grip of the brake band enough to let the brake drum turn without substantial change in the pull of the line. In other words, there will be no tendency for dirt or moisture to affect the braking action and cause the brake band to lock against the drum. The force of the spring 110 in this assembly is thus applied in compression against the brake band end in a manner and direction which may be considered as self-compensating and which provides a steady and uniform drag or retarding effect on the rotation of the brake drum and spool.

Because the construction permits the brake band to extend around a substantial portion of the circumference of the brake drum, the effective braking surface is increased and the possibility of wear of the parts is reduced. In this example the brake band extends around a major portion of the braking surface, i. e., more than half-way around the drum.

This construction of Figs. 1–10 accordingly permits the manual winding of the spool in either direction and the application of an adjustable braking action to retard rotation of the spool in one selected direction, i. e., the direction in which the line is unwound. The brake has no effect on manual rotation of the spool in the opposite or winding direction in view of the one-way clutch construction which permits free rotation of the spool in that direction.

The preferred embodiment of the invention shown in Fig. 11 includes many of the essential features described in connection with the device of Figs. 1–10. As illustrated, the arrangement of the brake mechanism has been modified primarily to provide an even wider range of adjustment of the spring tension.

In this embodiment, the side plate 22 of the fishing reel is essentially the same as that previously described. It includes the bearing post 52 on which the hub 66 of brake drum 62 is rotatably mounted. The brake band in this embodiment may be mounted on the same supporting post 104 as in the previous case. The brake band itself, however, is of somewhat different construction. This brake band 140 has a bearing or supporting portion 142 adapted to fit the stud 104 of the side plate to support the corresponding end of the brake band. The remainder of the brake band extends around the brake drum in a direction opposite to the direction of rotation of the brake drum when movement of the drum is to be retarded.

The effective length of this brake band 140 is substantially greater than that of the previous embodiment. Thus the band extends substantially all the way around the circumference of the brake drum, so that its second or opposite end 144 is almost immediately adjacent the supporting portion 142 of the first end of the band. This opposite end 144 of the brake band is provided with a spring engaging stop, which also serves as a supporting or guide bracket 146 and has an aperture 147 adapted to guide the flange 146 and brake band end along a supporting rod or guide member 148.

This guide rod extends circumferentially around the brake drum and brake band and is of circular configuration oriented co-axially with the axis of the bearing post 52. One end 150 of the guide rod 148 extends in the vicinity of the supported end 142 of the brake band and is provided with a bracket 152 secured to the casing member 22 by bolts 154. This mounting holds the guide member 148 rigidly in the position shown in Fig. 11. The guide 148 also extends almost entirely around the circumference of the brake drum and brake band, so that its opposite end 156 extends past the flange 146 on the brake band to a point near the brake band supporting post 104.

In this case, the tension spring 158 is mounted directly on the guide rod 148 so that the coils of the spring surround the rod and permit circumferential deformation of the spring by compression or extension along the rod. One end of the spring engages the flange 146 on the free end of the brake band 140. The other end of spring 158 engages an adjustable spring follower 160 similar to the spring follower 114 of the previous embodiment. This spring follower or flange 160 includes an opening 162 through which the guide rod 148 extends, so that the follower 160 also moves circumferentially along the rod 148.

The follower member 160, as in the previous case, is carried on an adjusting plate 164 which is rotatably and coaxially mounted on the bearing post 52. Plate 164 is provided with gear teeth 166 which mesh with the teeth of the adjusting gear 124 as in the previous case. Rotation of the adjustment knob 130 (Figs. 2 and 10) will thus rotate the plate 164 and change the position of the spring follower 160 in the manner previously described.

By virtue of the particular arrangement of parts in the present case, however, the range of this spring adjustment is even greater than in the embodiment of Figs. 1–10. As illustrated in Fig. 11, a range of adjustment is shown which varies from the heavy line position of Fig. 11 in which the spring 158 is fully compressed for maximum tension, to the dotted line position of the figure, in which the spring is fully extended to the point where it has just ceased to exert any tensioning force on the flange 146 and brake band. As indicated in the figure this range of adjustment extends over at least ninety degrees, i. e., one-quarter of the total circumference of the brake member 62. The range of this adjustment makes possible the use of a longer spring and thus provides for gradual variation of the braking effect and accurate selection of the desired tension within wide limits.

The preferred embodiment of Fig. 11 will thus function in the same manner described in connection with Figs. 1–10, but with the added advantages that the spring tension is adjustable over an extremely wide range and that the effective braking surface between the band and drum is substantially greater by virtue of the fact that substantially the entire circumference of the drum engages the brake band when the spring is tensioned.

The construction shown and described above thus provide fishing reel mechanisms which accomplish the objectives set forth at the beginning of this application and make possible a smooth, self-compensating, readily adjustable braking effect not achieved by devices of the prior art. Since minor variations and changes in the exact details of construction will be apparent to persons skilled in this field, it is intended that this invention shall cover all such changes and modifications as fall within the spirit and scope of the attached claims.

I claim as my invention:

1. In a fishing reel mechanism having a casing member, a spool member rotatably mounted with respect to the casing, and a brake member having a cylindrical brake surface operatively connected to the spool for positive rotation by the spool in at least one direction, the improvement comprising a brake band extending circumferentially around a major portion of the braking surface, the brake band having a first end secured against rotation and a second or free end provided with connecting means for a tensioning spring, a manually adjustable spring follower having a spring-engaging portion, means mounting said follower for movement of the spring engaging portion circumferentially of said brake member toward and away from said connecting means, and a tensioning spring extending in a curved path circumferentially around the brake surface between the spring follower portion and brake band connecting means, said spring being supported for resilient deformation in a direction along said circumferential path, whereby manual adjustment of the spring follower portion circumferentially of the brake member changes the tensioning force exerted by the spring on the second brake band end and thereby varies the braking effect on the brake surface and spool.

2. Fishing reel mechanism according to claim 1 in which the spring follower mounting means provides a range of movement of the spring follower between the fully tensioned and untensioned positions of the spring of at least one-quarter of the circumferential distance around the brake member.

3. Fishing reel mechanism according to claim 1 in which the brake member and spool are interconnected by one-way clutch mechanism for positive rotation of the brake member with the spool in one direction only.

4. Fishing reel mechanism according to claim 3 in which said brake band extends around the braking surface from its secured end to its second end in a circumferential direction opposite to said one direction in which the brake member is positively rotated with the spool.

5. Fishing reel mechanism according to claim 1 in which the connecting means on the second end of the brake band comprises a rod extending circumferentially beyond said second end and having a stop plate at its end, the tensioning spring including coils embracing said rod, and the spring follower portion moving along the rod, with the spring between the follower and end plate for automatic gradual compression in response to adjustment of the follower along the rod toward the stop plate, said follower being movable away from the stop plate to a position in which the spring is uncompressed and the brake member is free to rotate.

6. Fishing reel mechanism according to claim 1 having a fixed guide rod extending circumferentially around the brake member, the connecting means on the second end of the brake member having an aperture through which said rod projects to guide said end, and the tensioning spring having coils surrounding said rod and thereby supporting and guiding the spring between said connecting means and spring follower portion.

7. In a fishing reel mechanism having a casing member and a spool member rotatably mounted on said casing, the improvement comprising a brake member having a cylindrical brake surface coaxial with the axis of rotation of the spool and operatively connected to the spool for positive rotation by the spool in one direction, a brake band having a first end secured against rotation and a second or free end provided with a stop member for a tensioning spring, the brake band extending circumferentially around at least half of said braking surface from said first end to said second end, a spring adjustment member rotatably mounted coaxially of the brake member and spool and having a spring follower arm movable circumferentially of the brake member toward and away from said stop member, a guide member extending in a curved path circumferentially around the brake surface between said follower arm and stop, a coil spring supported on said guide for resilient deformation circumferentially along the guide in response to relative movement of the follower arm toward and away from the stop, and manually adjustable means for relative movement of the adjustment member.

8. Fishing reel mechanism according to claim 7 in which the adjustment member comprises gear teeth coaxial with the spool, and the manually adjustable means includes an adjusting gear of smaller radius meshing with said gear teeth, an adjusting shaft connected to said adjusting gear and projecting out through the casing, and a manually operable knob on the outer end of the shaft.

9. Fishing reel mechanism according to claim 8 including resilient latch means retaining said knob, shaft and gear selectively in different adjusted positions.

10. Fishing reel mechanism according to claim 7 having a manually rotatable winding shaft extending coaxially of the spool, bearing means in said casing for one end of the shaft, said brake member also being rotatably supported by said bearing means.

11. Fishing reel mechanism according to claim 10 in which the spring adjustment member is also rotatably supported by the bearing means for the spool shaft and brake member.

12. Fishing reel mechanism according to claim 11 having gearing between the spool shaft and spool for coaxial rotation of the spool at a higher speed than the shaft, said brake member including a central bearing, and said spool having a flange adjacent the brake rotatably supported by the central bearing of the brake member, and one-way clutch mechanism including a spring pawl and ratchet between the spool flange and brake member for positive rotation of the brake member by the spool only in said one direction.

13. Fishing reel mechanism according to claim 7 in which the brake band extends circumferentially from its first end to its second end in a direction opposite to said one direction.

14. Fishing reel mechanism according to claim 13 in which the spring extends from said stop in the same direction as said one direction of positive rotation of the brake member and said follower arm is adjustable to compress the spring against the stop thereby tensioning the brake band circumferentially in the direction opposite to said one direction.

15. Fishing reel mechanism comprising spaced rigidly connected first and second casing members, a manually operable winding shaft having a first end rotatably supported in the first casing member and the second casing having a bearing member rotatably supporting the second end of the shaft, a spool rotatable coaxially of the shaft between the casings, gearing supported between the first casing and spool and interconnecting the shaft and spool for rotation of the spool more rapidly than the shaft, a brake drum rotatably supported on said bearing member for rotation coaxially of the spool and shaft between the second casing and spool, said brake drum including a cylindrical outer braking surface and a cylindrical inner clutch face with internally facing one-way clutch teeth thereon, a spring pawl on said spool engaging said clutch teeth for positive rotation of the brake drum by the spool in only one direction, and a brake band having a first end secured to the second casing and a second or free end, with the brake band extending circumferentially around the braking surface from the first end to the second end in a direction opposite to said one direction, a stop on the second end of the brake band and a compression spring having one end engaging the stop with the spring extending circumferentially back from the stop along the brake band toward said first end, and a manually adjustable spring adjustment plate rotatably mounted on the second casing coaxially of the shaft and spool and having a spring follower arm movable circumferentially toward and away from the stop for respective compression and release of the spring, the range of compression adjustment of the follower arm and spring including at least one-quarter of the circumference around the brake drum.

16. In a fishing reel mechanism having a casing member, a spool member rotatably mounted on said casing, a brake member having a cylindrical brake surface coaxial with the axis of rotation of the spool, and one-way clutch means operatively connecting the brake member to the spool for positive rotation by the spool in only the unwinding direction of rotation of the spool, the improvement comprising a brake band having a first end secured against rotation and a second or free end provided with a stop member for a tensioning spring, the brake band extending circumferentially substantially all the way around the brake surface from its first end in a direction opposite to said unwinding direction of rotation, with said second end approaching closely adjacent said first end when the band is tightened into engagement with said brake surface, a spring adjustment member rotatably mounted coaxially of the brake member and spool and having a spring follower arm movable circumferentially of the brake band toward and away from said stop member as said adjustment member is rotated, a curved guide rod extending circumferentially of the brake member between said follower arm and stop along the path of movement of the follower arm, a coil spring supported on said guide rod with the coils of the spring surrounding said rod and compressed between said follower arm and stop for resilient deformation of the spring circumferentially along the rod in response to relative movement of the follower arm toward and away from the stop, and manually operable means for rotating and positioning the adjustment member selectively in any one of a plurality of adjusted positions in which said spring is placed under the desired compression for braking engagement of said brake band around substantially the entire brake surface.

References Cited in the file of this patent

UNITED STATES PATENTS

| | | |
|---|---|---|
| 268,235 | Hubbard | Nov. 28, 1882 |
| 1,398,429 | Harradine | Nov. 29, 1921 |

FOREIGN PATENTS

| | | |
|---|---|---|
| 11,134 | Great Britain | of 1905 |